(12) United States Patent
Marini

(10) Patent No.: US 11,168,921 B2
(45) Date of Patent: Nov. 9, 2021

(54) REMOVABLE PROTECTION MEMBER FOR BRACKETS SUPPORTING AIR-CONDITIONING UNITS

(71) Applicant: D. M. SYSTEMS SRLS, Cartura (IT)

(72) Inventor: Michele Marini, Este (IT)

(73) Assignee: D. M. SYSTEMS SRLS, Cartura (IT)

( * ) Notice: Subject to any disclaimer, the term of this patent is extended or adjusted under 35 U.S.C. 154(b) by 0 days.

(21) Appl. No.: 16/980,468

(22) PCT Filed: Mar. 11, 2019

(86) PCT No.: PCT/IB2019/051950
§ 371 (c)(1),
(2) Date: Sep. 14, 2020

(87) PCT Pub. No.: WO2019/175741
PCT Pub. Date: Sep. 19, 2019

(65) Prior Publication Data
US 2021/0018219 A1    Jan. 21, 2021

(30) Foreign Application Priority Data
Mar. 13, 2018    (IT) .................... 102018000003522

(51) Int. Cl.
*F16M 1/00*        (2006.01)
*F24F 13/32*       (2006.01)
(Continued)

(52) U.S. Cl.
CPC ............ *F24F 13/32* (2013.01); *F16B 5/12* (2013.01); *F16M 13/02* (2013.01)

(58) Field of Classification Search
CPC ............ F24F 13/32; F16B 5/12; F16M 13/02
(Continued)

(56) References Cited

U.S. PATENT DOCUMENTS 6,698,725 B1    3/2004    Berry
9,163,854 B2 *  10/2015   Arbucci ................. F24F 13/32
(Continued)

FOREIGN PATENT DOCUMENTS

AU    2010101438 A4    2/2011
JP    2005147561 A     6/2005
(Continued)

OTHER PUBLICATIONS

International Searching Authority, International Search Report of International App. No. PCT/IB2019/051950, dated Jul. 15, 2019, 3 pgs.
(Continued)

*Primary Examiner* — Todd M Epps
(74) *Attorney, Agent, or Firm* — Moyles IP, LLC

(57) ABSTRACT

A removable protection member for brackets configured to support air conditioning units, wherein the support bracket includes at least two substantially "L"-shaped supports suited to be secured to a bearing wall and at least one cross member suited to be secured to the bearing wall and to connect the supports, said protection member including at least one pair of first covering members intended to cover the supports, each first covering member being substantially "L"-shaped; at least one second covering member suited to cover a corresponding cross member; quick connection members associated with the pair of first covering members and with the covering member, the quick connection members being suited to make it easier to maintain the pair of first covering members removably attached to the respective supports and the second covering member removably attached to the corresponding cross member through interference.

18 Claims, 4 Drawing Sheets

(51) Int. Cl.
  *F16B 5/12* (2006.01)
  *F16M 13/02* (2006.01)
(58) Field of Classification Search
  USPC .......................................................... 248/674
  See application file for complete search history.

(56) References Cited

U.S. PATENT DOCUMENTS

| | | |
|---|---|---|
| D874,909 S * | 2/2020 | Marini ........................... D8/381 |
| 2003/0030048 A1 | 2/2003 | Quaintance et al. |
| 2003/0085395 A1 | 5/2003 | Gardner |
| 2003/0136954 A1 | 7/2003 | Platt |
| 2004/0099855 A1 | 5/2004 | Platt |
| 2005/0236612 A1 | 10/2005 | Platt |
| 2007/0131920 A1 | 6/2007 | Platt |
| 2011/0073746 A1* | 3/2011 | Padiotis .................... F24F 1/50 248/674 |
| 2014/0131647 A1 | 5/2014 | Dillon |
| 2018/0023842 A1 | 1/2018 | Gardikis et al. |
| 2021/0180828 A1* | 6/2021 | Xing ....................... F24F 1/031 |

FOREIGN PATENT DOCUMENTS

| | | | |
|---|---|---|---|
| JP | 2007120835 A | 5/2007 |
| WO | 0107817 A1 | 2/2001 |
| WO | 2008067598 A1 | 6/2008 |

OTHER PUBLICATIONS

International Searching Authority, Written Opinion of International App. No. PCT/IB2019/051950, dated Jul. 15, 2019, 5 pgs.

* cited by examiner

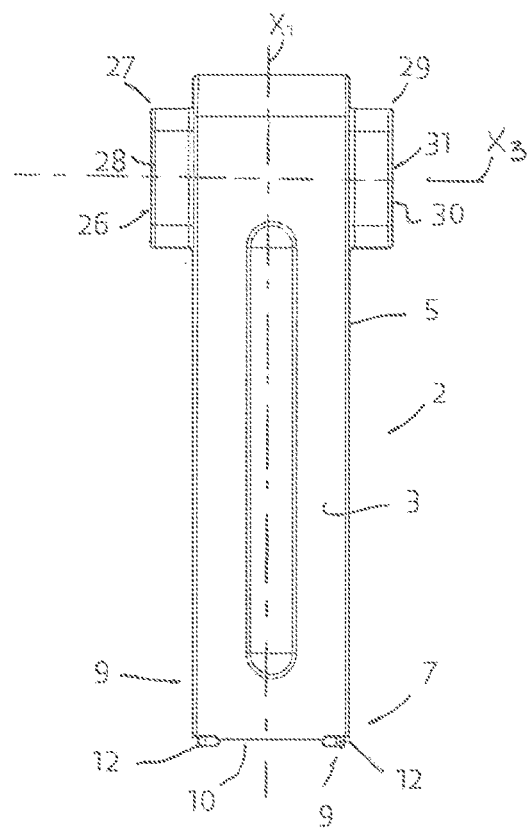
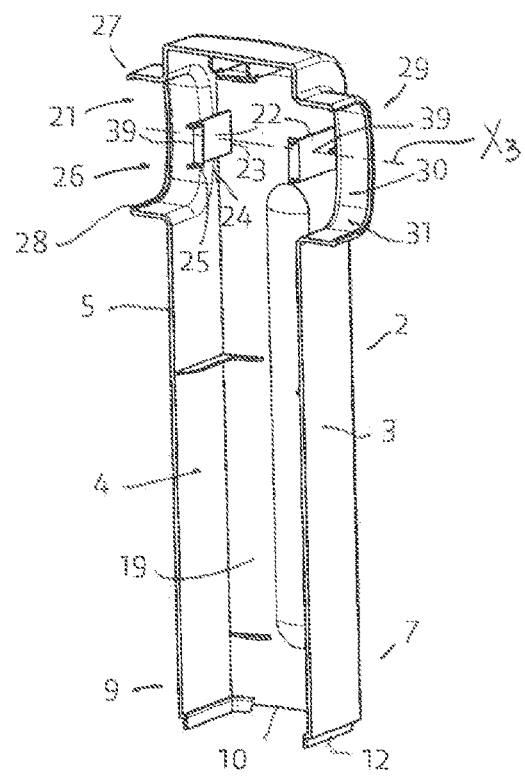
FIG. 3
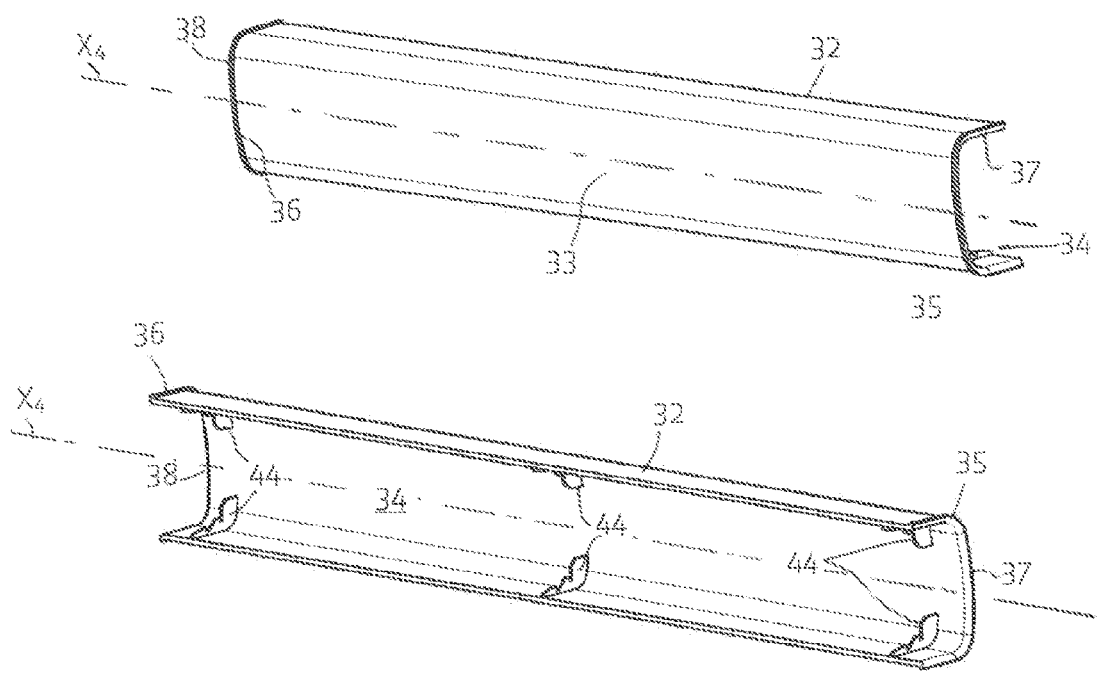
FIG. 4

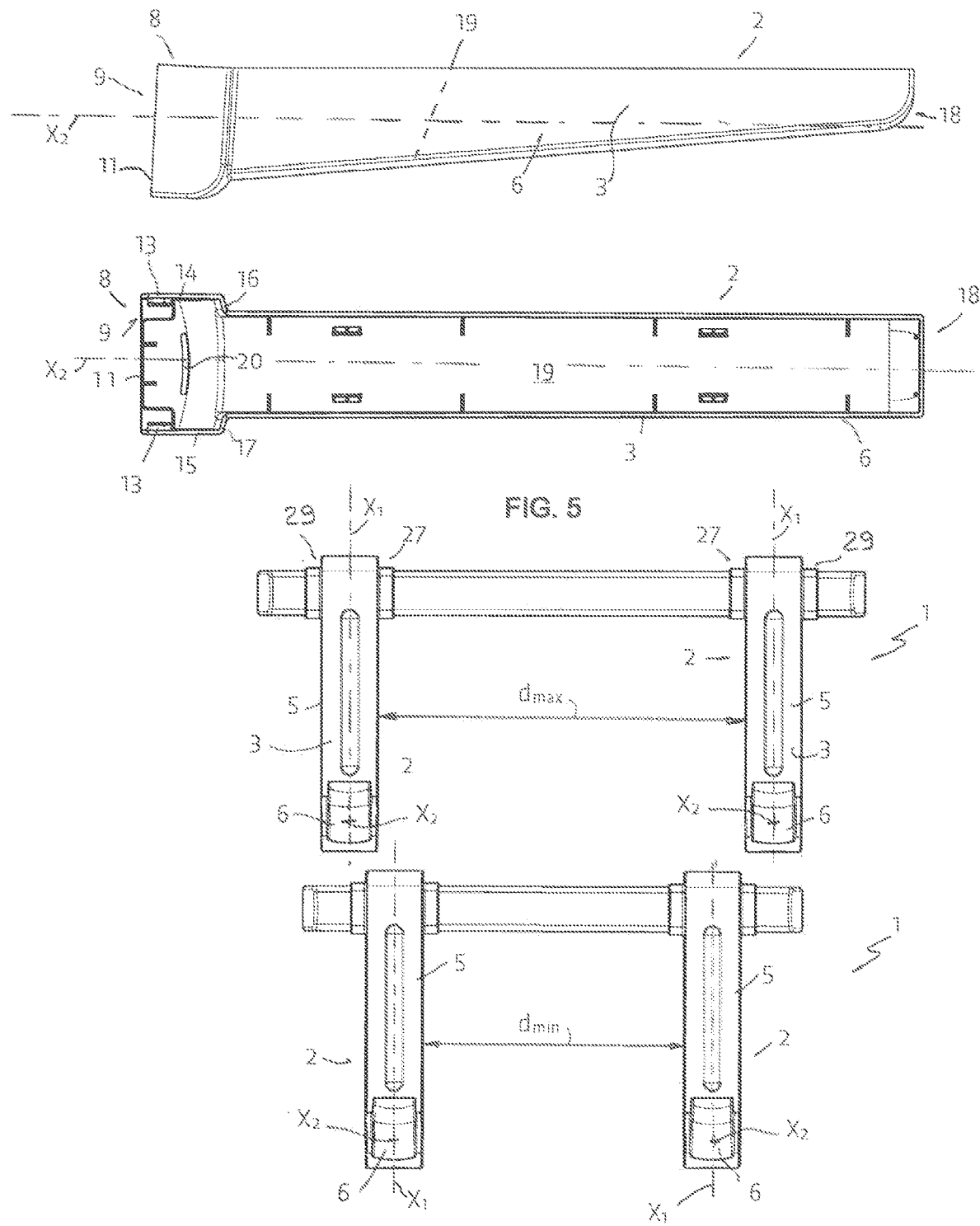

REMOVABLE PROTECTION MEMBER FOR BRACKETS SUPPORTING AIR-CONDITIONING UNITS

CROSS REFERENCE TO RELATED APPLICATIONS

This application is a National Stage of PCT Application No. PCT/IB2019/051950 filed on Mar. 11, 2019 which claims the benefit of and priority to Italian Patent Application No. 102018000003522 filed on Mar. 13, 2018 each of which is incorporated herein by reference in their entireties.

FIELD

The presently disclosed embodiment concerns the technical field of protection covers and the subject of the disclosed embodiment is a removable protection member for brackets configured to support air conditioning units.

BACKGROUND

As is known, air conditioning systems (climatisation, heating) generally include a unit equipped with a compressor and an electric motor, which is often positioned outside the room that must be heated or cooled.

These units are fixed to a wall of a building by means of a special supporting bracket made of a metallic material.

The bracket includes a pair of supports having two sides that substantially define the shape of an "L", wherein one of these sides is intended to be secured to the wall.

After the securing operation, one side of the support projects horizontally from the wall and is configured to allow the feet of the air conditioning unit to be rested and held thereon.

The air conditioning unit is generally provided with two pairs of feet that extend from its lower surface.

Obviously, the supports are secured to the wall at a distance that is substantially equal to the distance that separates the pairs of feet of the air conditioning unit.

Furthermore, a cross member is provided to strengthen the bracket and the ends of said cross member are joined to the supports.

More specifically, the ends of the cross member are joined to the side of the supports that is intended to be secured to the wall.

Furthermore, the cross member is secured to the wall, too, in such a way as to create, together with the supports, a bearing structure that is capable of supporting the weight of the air conditioning unit, at the same time allowing it to be secured to the wall in a stable manner.

The members of the bracket are made of an antioxidant material (for example, stainless steel) or are subjected to special surface treatments intended to prevent oxidation.

However, the oxidation process can affect also the brackets exposed to weather agents and therefore these components may present structural weaknesses that will reduce their load bearing capacity.

Furthermore, the distance that separates the feet of the air-conditioning units may vary according to the size of this device or according to the choices made by the building contractor.

Consequently, different types of air conditioning units require brackets of different sizes, more specifically in these brackets the changing element is the mutual distance that separates the horizontal sides of the supports.

Thus, it is not easy to make a protection member for these brackets, since each type of bracket and each size require a corresponding covering or protective member in a suitable size.

This configuration requires, therefore, the production of a large number of covering members that as a whole would be rather expensive.

Furthermore, a large number of covering members involves high management costs in terms of transport, storage and classification.

Finally, this type of solution poses a further drawback, represented by the fact that it is necessary to produce a covering member in a new size whenever a new bracket is introduced in the market.

SUMMARY

The presently disclosed embodiment intends to overcome the drawbacks described above by providing a removable protection member for brackets configured to support air-conditioning units that is simple and economic to construct.

More specifically, the object of the presently disclosed embodiment is to provide a removable protection member suited to protect the support brackets of air conditioning units from weather agents that may promote their corrosion.

It is a further object of the presently disclosed embodiment to provide a removable protection member that makes it possible to extend the useful life of the support brackets of air conditioning units, in such a way as to improve their safety and their resistance over time.

Again, it is another object of the presently disclosed embodiment to provide a removable protection member for the support brackets of air conditioning units that can be easily adapted to a large number of brackets having different sizes.

It is another, yet not the least object of the disclosed embodiment to provide a removable protection member for the support brackets of air conditioning units that is particularly flexible and versatile to use.

These and other objects that are described in greater detail below are achieved by a removable protection member for the support brackets of air conditioning units.

BRIEF DESCRIPTION OF THE DRAWINGS

The advantages and the characteristics of the presently disclosed embodiments are clearly illustrated in the following detailed description of non-limiting embodiment of a removable protection member for the support brackets of air conditioning units, with reference to the following drawings, wherein:

FIG. 3 shows, respectively, a front view and a rear perspective view of a first detail of FIG. 1;

FIG. 4 shows, respectively, a front and a rear perspective view of a second detail of FIG. 1;

FIG. 5 shows, respectively, a side view and a top view of a third detail of FIG. 1;

FIG. 6 shows two front views of the protection member of FIG. 1 in two different operating positions, respectively;

DETAILED DESCRIPTION

Figure 1:
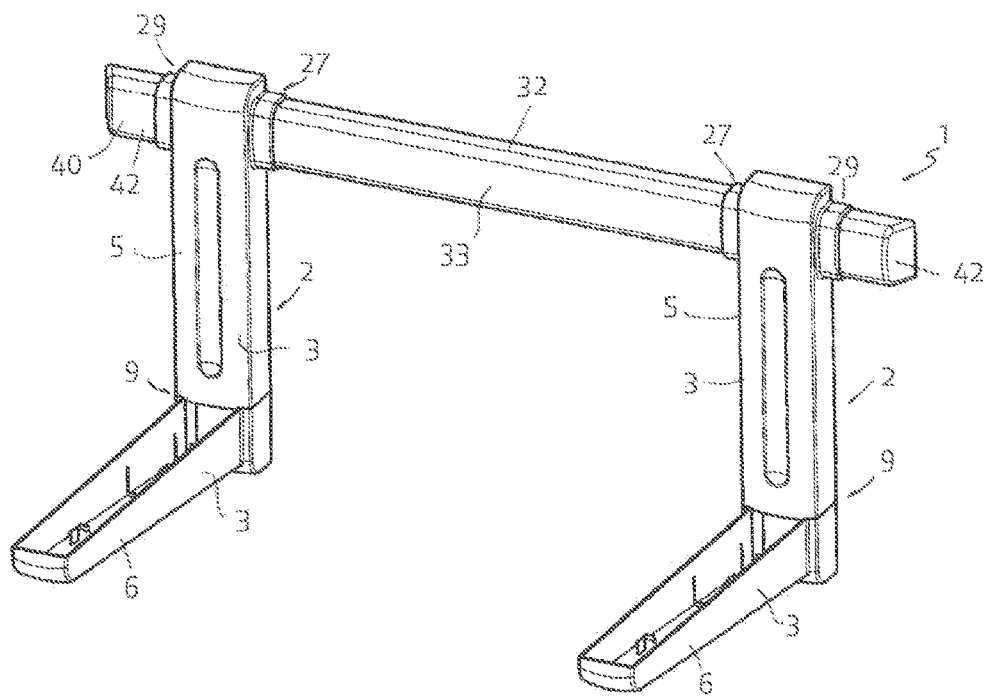
FIG. 1 shows a front perspective view of a removable protection member for the support brackets of air conditioning units in a configuration.

The presently disclosed embodiment concerns a removable protection member for the support brackets of air conditioning units.

As can be better seen in FIG. 7, this protection member, hereinafter indicated by the reference numeral 1, can be removably applied to a bracket S made up of at least two supports B, each one of which is substantially "L"-shaped, and at least one straight cross member T designed to connect said supports B.

In the configuration illustrated in the Figure, the bracket S comprises one pair of supports B having the same size and a single cross member T.

The upper side $B_1$ of the supports B is configured to be secured to the wall of a building or to any other bearing wall, generally by means of dowels or similar anchoring systems.

At the level of said side $B_1$, furthermore, it is possible to make some slits, not visible in the figures, which are intended to allow the cross member T to be slidably inserted therein and to allow the distance that separates the supports B to be adjusted, if necessary.

The support B has also a lower side $B_2$ that will not be secured to the bearing wall.

The upper side $B_1$ and the lower side $B_2$ can be mutually joined in correspondence with one end, so that the support has substantially the shape of an "L".

When the upper side $B_1$ is secured to the wall, the lower side $B_2$ projects from the latter in a direction that is substantially orthogonal to it.

According to an aspect, the cross member T is secured to the wall by means of dowels or similar anchoring systems.

The removable protection member 1 that is the subject of the presently disclosed embodiment comprises at least one pair of first covering members 2 designed to cover the supports B and therefore suited to be substantially "L"-shaped.

Figure 7:
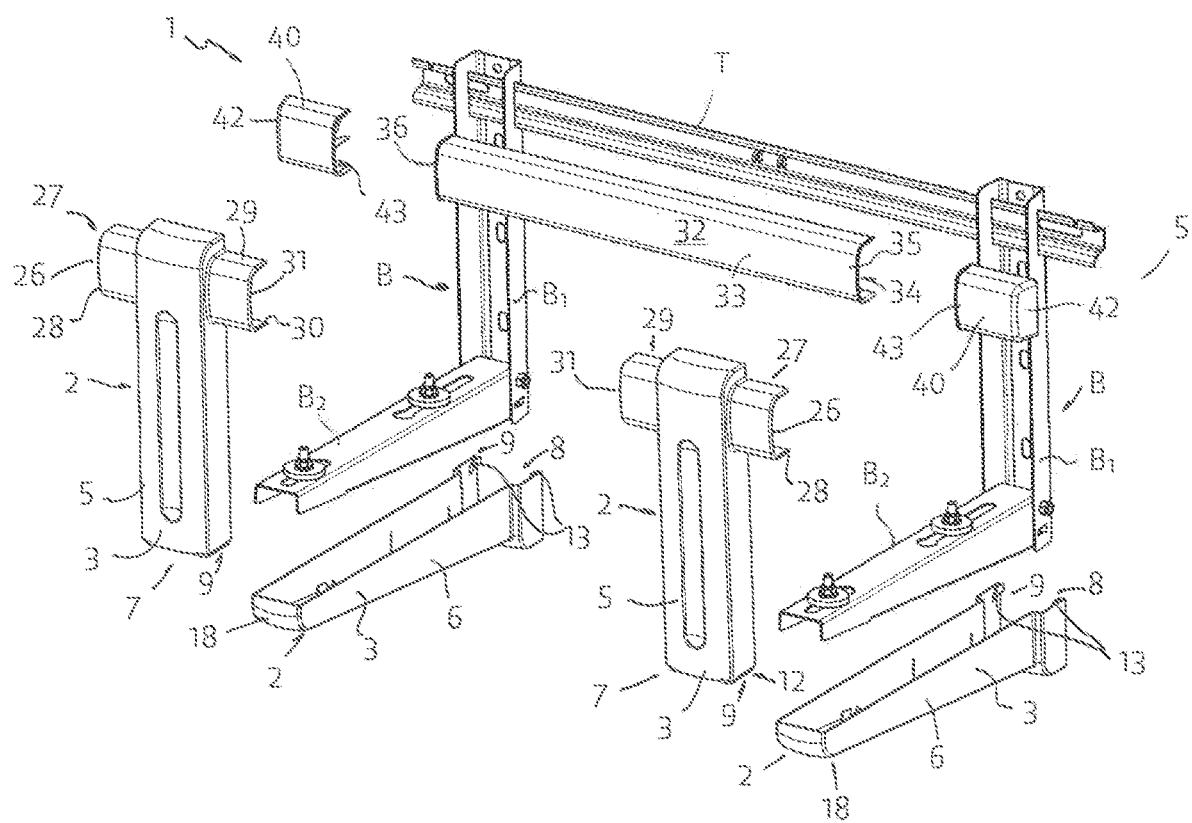
FIG. 7 shows an exploded perspective view of the protection member of FIG. 1 and of a support bracket for air conditioning units.

As can be observed in greater detail in the configuration of the covering member shown in FIGS. 1 and 7, there is a single pair of first covering members 2 designed to cover the corresponding pair of supports B of the bracket S.

The first covering members 2 have a side 3 whose cross section substantially has the shape of an open half shell, as shown in FIG. 3.

The opening 4 made in the half shell-shaped side 3 makes it possible to apply these members 2 to the supports B even when the latter are secured to the bearing wall.

According to an aspect, as can be seen in FIGS. 3 and 5, each first covering member 2 comprises an upper portion 5 and a lower portion 6 that are substantially straight and extend along respective extension directions $X_1$, $X_2$ that are straight, too.

The upper portion 5 can be positioned on the upper side $B_1$ of the support, in such a way as to orient the opening 4 towards the wall and make it easier to cover said side $B_1$ from above with the half shell-shaped side 3.

The lower portion 6, instead, can be positioned on the lower side $B_2$ of the support B, in such a way as to orient the corresponding opening 4 upwards and make it easier to cover said side $B_2$ from below with the half shell-shaped side 5.

The upper portion 5 and the lower portion 6 of the first covering member 2 can be coupled with each other in correspondence with one of their ends 7, 8 and for this purpose fixed joints 9 are also provided, which are associated with said ends 7, 8.

Both coupling ends 7, 8 of the upper portion 5 and of the lower portion 6 are provided with an open edge 10, 11 and the fixed joints 9 make it possible to promote the removable coupling of said portions 5, 6 in such a way as to angularly space the respective extension directions $X_1$, $X_2$ by approximately 90°.

In this way, the shape of the first covering members 2 will substantially be equal to the geometric "L" shape of the supports B of the bracket S.

The fixed joints 9 may comprise at least one shaped extension 12 that extends starting from the open edge 10 of the upper portion 5.

More specifically, as better illustrated in FIG. 3, there can be two projecting extensions 12 substantially in the shape of an "L".

The projecting extensions 12 can be configured in such a way as to interact with a counter-shaped side 13 obtained in the second lower portion 6 in correspondence with its end 8.

In the configuration of the lower portion 6 illustrated in FIG. 5, in correspondence with its end 8, a seat is formed that is respectively delimited by the counter-shaped side 13 defined by one pair of sides 14, 15 parallel to the extension direction $X_2$ and by one pair of sides 16, 17 substantially orthogonal to the extension direction $X_2$.

In order to allow the upper portion 5 to be coupled with the lower portion 6, it will suffice to insert the extensions 12 of the upper portion 5 in the seat delimited by the counter-shaped side 13 of lower portion 6.

In this way, it will be possible to promote the interference through contact between the outer surface of the "L"-shaped extensions 12 and the inner surface of the respective pairs of parallel sides 14, 15; 16, 17 that delimit the seat.

According to an aspect, as is better visible in FIG. 5, the lower portion 6 of each first covering member 2 can have the maximum perimeter extension in correspondence with the end 8 suited to be coupled with the upper portion 5.

The perimeter extension of the other end 18 of the second lower portion 6, instead, will be minimum, since, as better illustrated in the Figures, the value of said extension decreases progressively along the extension direction $X_2$ of the second portion 6, in such a way as to be minimum exactly in correspondence with said end 18.

This particular configuration makes it possible to shape the inner surface 19 of the side 3 of the lower portion 6 in such a way that it is inclined with respect to the horizontal; said inclination promotes the accumulation of condensation water (or of other liquids flowing out of the air conditioning unit) in correspondence with the end 8 with maximum perimeter extension.

In correspondence with the end 8 with maximum extension there is a drainage opening 20 for said liquids, intended to prevent them from stagnating in the interspace formed between the second side $B_2$ of the support B and the half shell-shaped side 3.

Quick connection members 21 are also provided, (see, for instance, FIG. 3), which are associated with the first covering members 2 and are suited to removably maintain the same attached to the corresponding support B through interference.

The quick connection members 21 may comprise a plurality of elastic tabs 22 distributed along the extension directions $X_1$, $X_2$ of the first covering members 2.

In the configuration of the disclosed embodiment illustrated in the figures, the elastic tabs 22 are distributed along the extension direction $X_1$, $X_2$ of the upper portion 5 and of the lower portion 6.

As can be better seen in FIGS. 3 and 5, each tab 22 is provided with an end 23 joined to the inner surface 19 of the half shell-shaped side 3 of the upper portion 5 and of the lower portion 6.

The other end 24 of the tabs 22 is free and furthermore is provided with a shaped surface 25 intended to interact with the outer surface of the corresponding support B to make it easier to removably snap-fit the latter in the portions 5, 6 of the first covering members 2.

More specifically, the terminal surface 25 of the tabs 22 can define a step, not illustrated in the Figures, suited to be snap-fitted on a corresponding edge of the upper side Bi and of the lower side $B_2$ of the support B.

Figure 2:
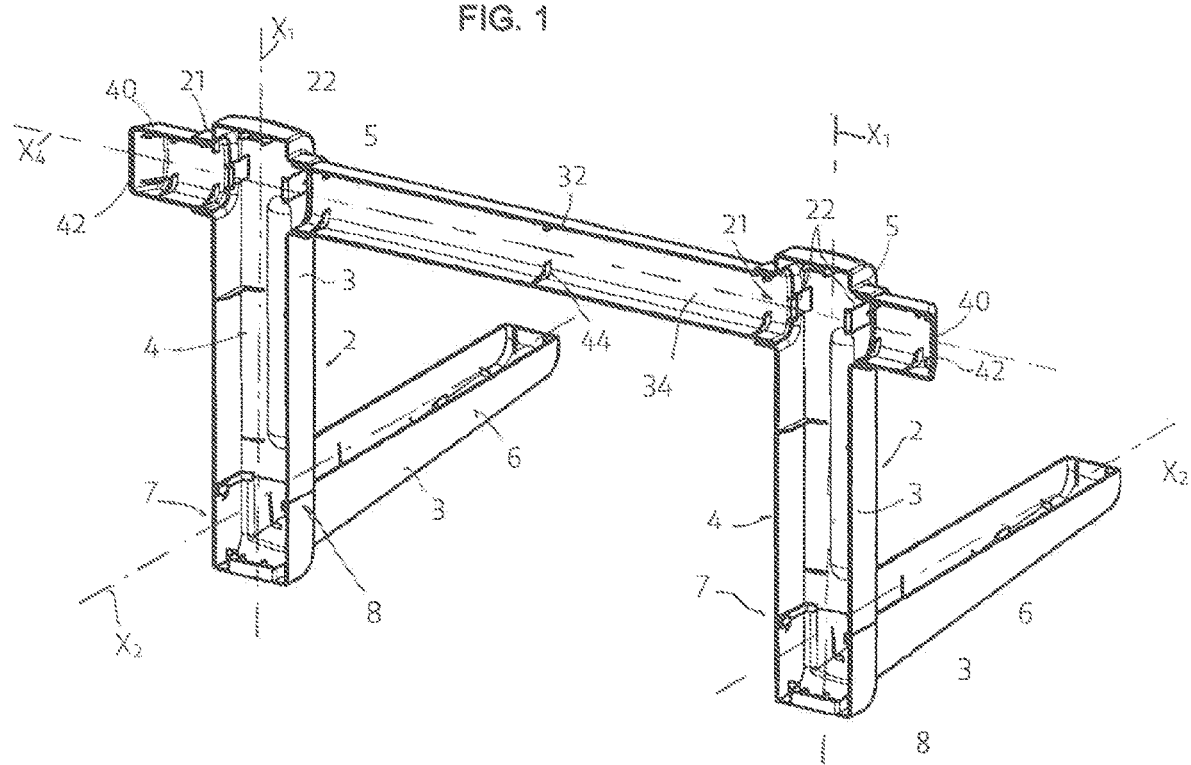
FIG. 2 shows a rear perspective view of the protection member shown in FIG. 1.

Conveniently, as better illustrated in FIGS. 1, 2 and 7, a first pair of passages 26 can be formed in the half shell-shaped side 3 of the first covering members 2, wherein said passages 26 face each other and are positioned in correspondence with the cross member T of the bracket S.

The first covering members 2 may also comprise at least two side projections 27 that extend along an extension direction $X_3$ substantially orthogonal to the extension direction $X_1$ of the corresponding portions 5, 6.

More specifically, the projections 27 are positioned in correspondence with the cross members T of the brackets S and can be directed inwards, in such a way as to be arranged in a mutually facing position.

Furthermore, said projections 27 have a side 3 whose cross section is in the shape of a half shell and which is provided with an open terminal edge 28 that makes it possible to define a corresponding passage 26.

The first covering members 2 may also comprise further projections 29, better visible in FIG. 3, that extend outwards along a corresponding extension direction $X_3$ orthogonal to the extension direction of the corresponding portion $X_1$, $X_2$.

These further projections 29 can be aligned with the projections 27 that extend inwards, so that they have the same extension direction $X_3$.

Consequently, even these further projections 29 are positioned in correspondence with a respective cross member T of the bracket S.

Even these projections 29 have an open terminal edge 30 suited to define a corresponding passage 31.

Thus, in the configuration of the disclosed embodiment illustrated in the Figures there is one pair of projections 29 that extend inwards and one pair of projections 27 that extend outwards.

Furthermore, all the projections 27, 29 extend starting from the upper portion 5 of the first covering members 2.

However, in alternative configurations of the disclosed embodiment not illustrated in the Figures, further pairs of projections may be present, provided with corresponding passages, obtained in the first portion and/or in the second portion and positioned in correspondence with all the cross members used in the support bracket.

According to an aspect, the pair of elastic tabs 22 can be positioned in correspondence with the mutually facing passages 26 obtained in the first covering members 2.

FIG. 3 shows a single upper portion 5 of the first covering members 2 that is provided with a tab 22 aligned with the passage 26 formed in the corresponding projection 27 extending inwards.

In a manner similar to that described above, a further tab 22 can be aligned with the passage 31 formed in the projection 29 extending outwards.

The protection member 1 comprises at least one second covering member 32 intended to cover a corresponding cross member T.

Even in this case the second covering member 32 is provided with a side 33 whose cross section is in the shape of an open half shell, so as to allow it to be applied to the corresponding cross member T.

Even in this case the second covering member 32 can be positioned on the cross member T, in such a way as to orient the corresponding opening 34 towards the wall.

More specifically, in the configuration of the disclosed embodiment illustrated in the Figures there is only one second covering member 32 intended to cover the only cross member T used in the bracket S.

The second covering member 32 extends along a substantially straight direction $X_4$ and is provided with two ends 35, 36, each having an open edge 37, 38 intended to be slidably inserted in the mutually facing passages 26 formed in the first covering members 2.

As can be better seen in FIGS. 2 and 5, the end 35, 36 of the second covering member 32 can be slidably inserted in the passages 26 of a corresponding projection 27 formed in the first portion 5 of the first covering members 2.

More specifically, said end 35, 36 can slide between a first and a second end position.

In the first end position, illustrated in the first drawing in FIG. 6, the edge 37, 38 of the second covering member 32 is substantially level with the passage 26.

In the second end position, illustrated in the second drawing in FIG. 6, the edge of the end 37, 38 of the second covering member 32 abuts against the outer surface 39 of the tab 22 aligned with the corresponding passage 26.

By varying the position of the terminal edges 37, 38 of the second covering member 32 with respect to the passage 26, it will be possible to adjust the mutual distance d that separates the first covering members 2.

More specifically, it will be possible to position them at the minimum distance $d_{min}$ when the edge of the end 37, 38 of the second protection member 32 is in the second end position, while they will be positioned at the maximum distance $d_{max}$ when said edge 37, 38 is in the first end position.

Conveniently, the extension e of the projections can be selected in such a way as to allow a range $\Delta$ between 5 cm and 15 cm ($d_{max}=d_{min}+\Delta$) for the distance that separates the first covering members.

The covering may furthermore comprise one pair of straight side members 40 also provided with a side 41 whose cross section has the shape of an open half shell.

As can be better seen in FIGS. 2, 6 and 7, these side members have a closed end 42 and an open end 43 designed to be slidably inserted in the passages 31 formed in the projections 29 of the first covering members 2 facing outwards.

The side members 40 make it possible to cover the end portions of the cross member T that project outside the supports.

With reference to the second covering member 32 and to the side members 40, the quick connection members 21 may comprise a plurality of shaped edges 44 (visible in FIG. 4) that extend from the inner surface 39 of the half shell-shaped side.

The shaped edges 44 extend along respective directions that are substantially orthogonal to the extension direction of the members 32, 40, and in particular the shape of said edges 44 is selected so that it interacts with the profile of the cross member.

The interaction of the shaped edges 44 with the profile of the cross member T makes it easier to removably snap-fit the latter in the second covering member 32 or in the side members 40.

According to an aspect, the upper and the lower portion of the first covering members, the second covering members and the side members can be made of a selected polymeric material through an injection moulding process.

The presently disclosed embodiment can be carried out in other variants, all of which fall within the scope of the features claimed and described herein; these technical details can be replaced by different but technically similar components and materials; the disclosed embodiment can be carried out in any shapes and sizes, provided that they are compatible with its intended use.

The reference numerals and signs added in the description are intended to make the text clearer to understand and must not be considered as elements intended to limit the technical scope of application of the objects or processes which they are meant to identify.

The invention claimed is:

1. A removable protection member for support brackets supporting air-conditioning units, wherein the support bracket comprises at least two substantially "L"-shaped supports designed to be secured to a bearing wall and at least one cross member designed to be secured to the bearing wall and suited to connect the supports, said protection member comprising:
at least one pair of first covering members designed to cover the supports, each first covering member being substantially in a shape of an "L";
at least one second covering member designed to cover a respective cross member;
quick connection members associated with said at least one pair of first covering members and with said at least one second covering member, said quick connection members being designed to maintain said at least one pair of first covering members removably attached to the respective supports and said at least one second covering member removably attached to the respective cross member through interference;
wherein each first covering member and each second covering member has a side whose cross section substantially has a shape of an open half shell, so as to allow a removable insertion of the supports and of at least one cross member.

2. The protection member of claim 1, wherein the lower portion of each of the first covering member has a maximum perimeter extension in correspondence with the lower portion end designed to be coupled with said upper portion, said perimeter extension gradually decreasing along the extension direction of said lower portion so that it is minimum in correspondence with the other end thereof.

3. The protection member of claim 2, further comprising a drainage opening configured to drain condensation water or other liquids and formed in said lower portion, said drainage opening being located in correspondence with the lower portion end designed to be coupled with said upper portion.

4. The protection member of claim 1, wherein each of the first covering members comprise an upper portion and a lower portion designed to be mutually coupled in correspondence with a respective end, each of said upper portion and said lower portion defining respective substantially straight extension directions.

5. The protection member of claim 4, further comprising fixed joints associated with coupling ends of each of said upper portion and of said lower portion and designed to allow the removable coupling of said portions so as to angularly space along the respective extension directions by substantially 90°.

6. The protection member of claim 5, wherein said fixed joints comprise at least one projecting shaped extension which projects from an edge of the upper portion end and one counter-shaped side formed in correspondence with the lower portion end, said at least one projecting shaped extension being designed to interact with the counter-shaped side to maintain said upper portion and said lower portion attached to each other through interference.

7. The protection member of claim 1, further comprising a first pair of passages formed in the half shell-shaped side of each pair of said first covering members, said passages facing each other and being positioned substantially in proximity to the cross member.

8. The protection member of claim 7, wherein said at least one second covering member extends along its own substantially straight extension direction and has a pair of ends having an edge portion designed to be slidably inserted into the passages formed in the half shell-shaped side of said first covering members or in said at least two projections formed in each of said pair of first covering members.

9. The protection member of claim 8, wherein said quick connection members comprise a plurality of elastic tabs, each tab having an end joined to an inner surface of the half shell-shaped side of the corresponding first covering members and an opposite free end provided with a shaped surface designed to interact with the outer surface of the respective support so as to make it easier to removably snap-fit each first covering member into the respective support.

10. The protection member of claim 9, wherein at least one pair of the elastic tabs is aligned with the passages, the outer surface of said at least one pair of the elastic tabs forming an abutment element for the edge of the corresponding second covering member slidably inserted in said passage.

11. The protection member of claim 7, wherein each pair of first covering members has at least two projections whose cross section has the shape of an open half shell and which are provided with said passages, said at least two projections being positioned in correspondence with the cross member so as to extend inwards along an extension direction which is substantially orthogonal to the extension direction of the respective first covering member.

12. The protection member of claim 11, wherein each said pair of first covering members has further projections whose cross section has the shape of an open half shell and which define further passages, said further projections being located in correspondence with the cross member so as to extend outwards along the substantially orthogonal extension direction.

13. The protection member of claim 12, further comprising at least one pair of straight side members having a side whose cross section has substantially the shape of an open half shell, said side members being designed to be slidably inserted in said further passages so as to cover the ends of the cross member which project outwards with respect to the supports.

14. The protection member of claim 13, wherein an inner surface of said at least one second covering member further comprise said quick connection members, said quick connection members comprise a plurality of shaped edges, said shaped edges being suited to interact with the profile of the cross member so as to make it easier to removably snap-fit said at least one second covering member into the cross member.

15. The protection member of claim 11, wherein said at least one second covering member extends along its own substantially straight extension direction and has a pair of ends having an edge portion designed to be slidably inserted into the passages formed in the half shell-shaped side of said first covering members or in said at least two projections formed in said first covering members.

16. A removable protection member for a support structure supporting an air-conditioning unit, wherein the support structure includes a pair of substantially L-shaped support brackets joined by a cross-member, the protection member comprising:

covering members comprising:
- a first L-shaped first covering member and a second L-shaped first covering member, each of the L-shaped first covering members configured to cover the respective L-shaped support brackets;
- a second covering member configured to cover the cross-member;
- a quick connection member associated with each of the first L-shaped first covering member, the second L-shaped first covering member and the second covering member, the quick connection member being designed to maintain the covering members removably attached to the support structure through interference;

wherein each of the first covering members and the second covering member has a side having a cross section substantially in a shape of an open half shell, and each of the quick connection members are positioned within the open half shell and project outwardly from an inner surface of the half shell to engage the support structure.

17. The protection member of claim 16, further comprising:

each of the first covering members comprise an upper portion and a lower portion, each of the upper portion and the lower portion having a first and a second end, wherein the second end of the upper portion and the first end of the lower portion a fixed joint for coupling the upper portion to the lower portion at a substantially 90° angle.

18. The protection member of claim 17, wherein each of the fixed joints comprise at least one projecting shaped extension which projects from an edge second end of the upper portion and a counter-shaped side formed in the first end of the lower portion, and the at least one projecting shaped extension configured to interact with the counter-shaped side to connect the upper portion to the lower portion.

* * * * *